United States Patent

Sawamura et al.

[11] Patent Number: 5,839,987
[45] Date of Patent: Nov. 24, 1998

[54] CONTROL SYSTEM FOR CHANGING THE TIME PERIOD AT WHICH TORQUE IS INCREASED AS A FUNCTION OF THE TIME PERIOD AT WHICH A CLUTCH IS DISENGAGED

[75] Inventors: Kazutomo Sawamura; Hisashi Igarashi; Yoshiharu Saito; Kenichiro Ishii, all of Wako, Japan

[73] Assignee: Honda Giken Kogyo Kabushiki Kaisha, Tokyo, Japan

[21] Appl. No.: 848,579

[22] Filed: Apr. 28, 1997

[30] Foreign Application Priority Data

Apr. 30, 1996 [JP] Japan ................................. 8-132775

[51] Int. Cl.⁶ .................................................. F02D 41/04
[52] U.S. Cl. ............................ 477/107; 477/110; 477/111
[58] Field of Search .................................... 477/107, 109, 477/110, 111, 120

[56] References Cited

U.S. PATENT DOCUMENTS 5,058,013  10/1991  Iwatsuki et al. ........................... 701/51
5,091,854   2/1992  Yoshimura et al. ....................... 701/51

FOREIGN PATENT DOCUMENTS 0 549 001 A3  5/1992  European Pat. Off. .
0 549 001 A2  6/1993  European Pat. Off. .
41 15 821 A1  11/1991  Germany .
5-321707  12/1993  Japan .

OTHER PUBLICATIONS

Patent Abstracts of Japan, vol. 018, No. 143 (M–1574), 9 Mar. 1994 & JP 05 321707 A (Nippondenso Co Ltd), 7 Dec. 1993.

Patent Abstracts of Japan, vol. 009, No. 303 (M–434_, 30 Nov. 1985 & JP 60 139537 A (Honda Giken Kogyo KK), 24, Jul. 1985.

*Primary Examiner*—Khoi Q. Ta
*Attorney, Agent, or Firm*—Armstrong, Westerman, Hattori, McLeland & Naughton

[57] ABSTRACT

A control system for an internal combustion engine for an automotive vehicle increases the output torque of the engine during an upshift of the automatic transmission so as to reduce a shock generated during the upshift. Time periods are measured over which respective speed clutches of the automatic transmission have been disengaged. The timing of increasing the output torque of the engine during the upshift of the automatic transmission is changed, based on one of the time periods measured over which one of the speed clutches of the automatic transmission to be selected for the upshift has been disengaged.

6 Claims, 12 Drawing Sheets

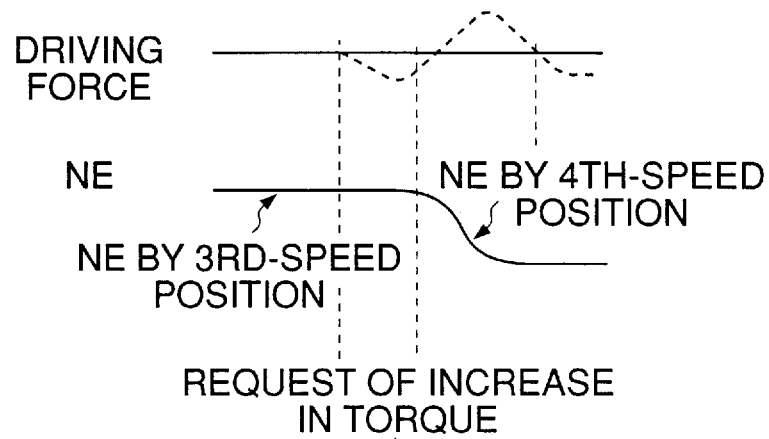
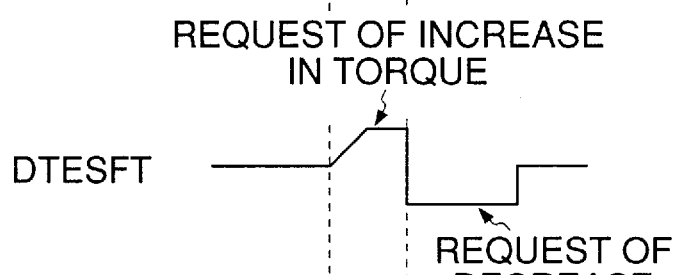
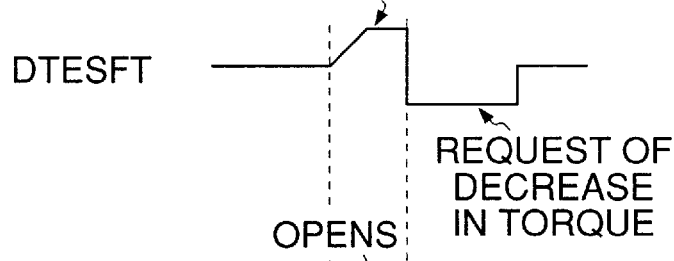

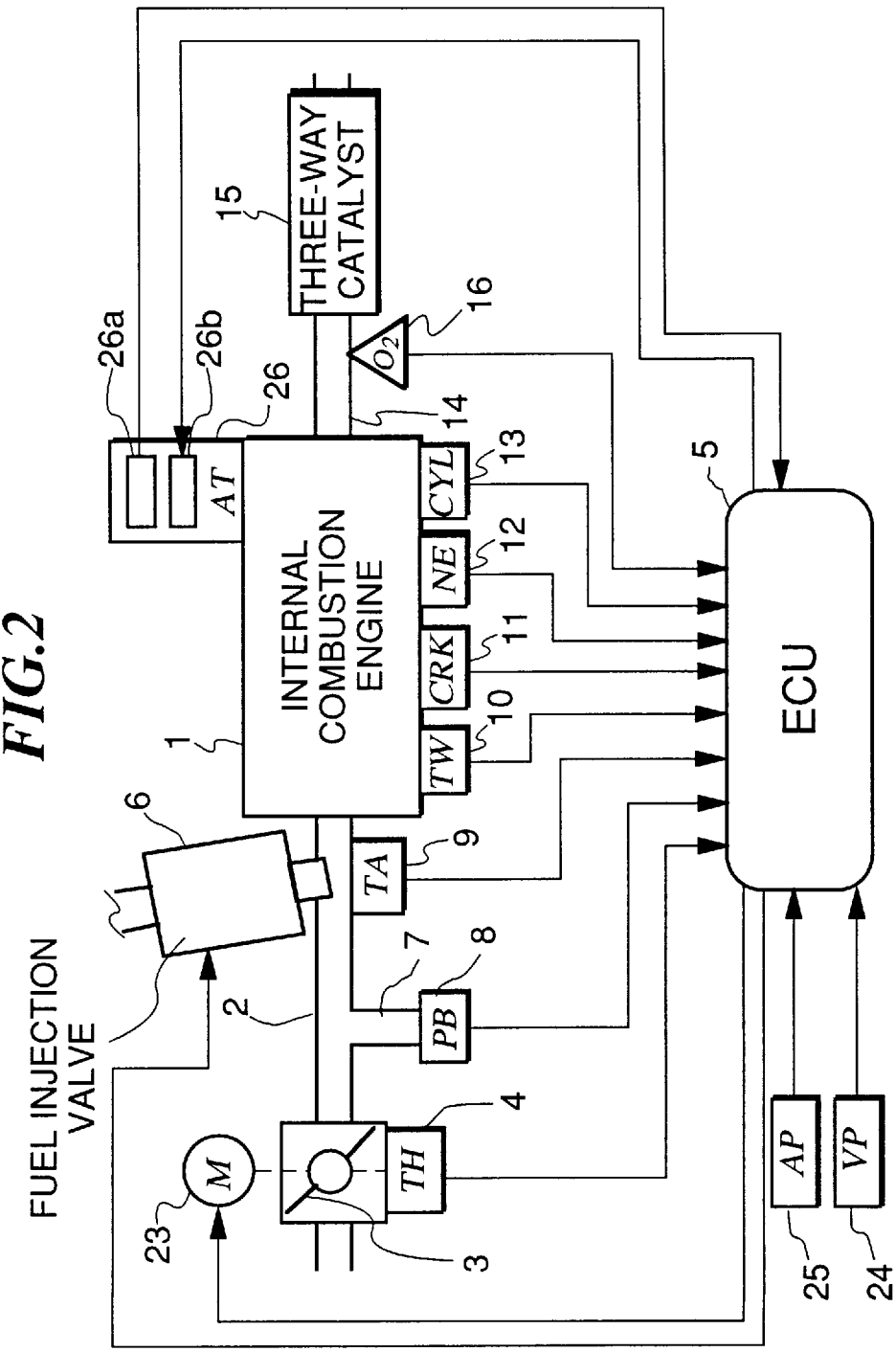

CONTROL SYSTEM FOR CHANGING THE TIME PERIOD AT WHICH TORQUE IS INCREASED AS A FUNCTION OF THE TIME PERIOD AT WHICH A CLUTCH IS DISENGAGED

BACKGROUND OF THE INVENTION

1. Field of the Invention

This invention relates to a control system for internal combustion engines for automotive vehicles, which is capable of reducing a shock generated during an upshift of an automatic transmission of the engine.

2. Prior Art

Conventionally, a throttle valve control system for internal combustion engines for automotive vehicles has been proposed e.g. by Japanese Laid-Open Patent Publication (Kokai) No. 5-321707, which reduces a shock generated during gear shifting of an automatic transmission of the engine.

The proposed throttle valve control system adjusts the opening of a throttle valve arranged in the intake pipe of the engine by controlling a throttle actuator during an upshift of the automatic transmission, in which the reduction gear ratio of the automatic transmission is decreased, such that the engine output torque is increased temporarily and then decreased to a lower level than a level before the gear shifting is carried out, to thereby reduce a shock which can be generated during the upshift by a deceleration of the vehicle immediately after the start of the upshift and an acceleration of the same after completion of the upshift.

FIGS. 1A to 1F show changes in parameters obtained when the engine output torque is changed by the manner of the conventional throttle valve control for reduction of a shock during gear shifting. For instance, when a gear shifting command is issued to change over the gear shift position from the third-speed position to the fourth-speed position as shown in FIG. 1A, the throttle valve opening TH is progressively increased at the start of the gear shifting by the use of an engine output torque correction amount DTESFT set in response to a demand for increase of the engine output torque, to thereby increase the engine output torque. Thereafter, when the changeover of the gear shift position from the third-speed position to the fourth-speed position is completed, the throttle valve opening TH is decreased by the engine output torque correction amount DTESFT set in response to a demand for decrease of the engine output torque to a value smaller than a value assumed immediately before the start of the upshifting, whereby the engine output torque is decreased. This causes the driving force of the vehicle to smoothly change (as indicated by the solid line in FIG. 1B) to thereby reduce a shock generated during the upshift. The timing of increasing the engine output torque should coincide with the timing of a decrease in the driving force of the vehicle (indicated by broken line in Fig. 1B) caused by the gear shifting.

However, the timing of actual increase in the engine output torque depends on variations in operation between different speed clutches of the automatic transmission, which makes it difficult to precisely set this timing to the timing of a decrease in the driving force caused by gear shifting.

The variations in operation between speed clutches, i.e. the second to fourth-speed clutches of the automatic transmission arise from differences between amounts of oil filled within the respective speed clutches (including hydraulic passages therefor). These differences result in a different manner of rise in the operating hydraulic pressure within a target speed clutch selected for an upshift, which makes it impossible in some cases to positively reduce a shock caused by the upshift.

SUMMARY OF THE INVENTION

It is the object of the invention to provide a control system for internal combustion engines for automotive vehicles, which is capable of coping with variations in operation between speed clutches of an automatic transmission of the engine, to thereby positively reduce a shock caused by gear shifting of the automatic transmission.

To attain the above object, the invention provides a control system for an internal combustion engine for an automotive vehicle, the engine having an automatic transmission having a plurality of speed clutches, and engine output torque-increasing means operable during an upshift of the automatic transmission, for increasing output torque of the engine so as to reduce a shock generated during the upshift.

The control system according to the invention is characterized by comprising:

measuring means for measuring time periods over which respective ones of the speed clutches of the automatic transmission have been disengaged; and timing-changing means for changing timing of increasing the output torque of the engine during the upshift of the automatic transmission, based on one of the time periods measured by the measuring means over which one of the speed clutches of the automatic transmission to be selected for the upshift has been disengaged.

Preferably, the control system includes second measuring means for measuring a second time period over which the automatic transmission has continuously been in a neutral position, and wherein the timing-changing means changes the timing of increasing the output torque of the engine, based on the second time period measured by the second measuring means, in place of the one of the time periods over which the one of the speed clutches of the automatic transmission to be selected for the upshift has been disengaged.

More preferably, the control system includes delay time period-calculating means for adding a delay time period correction value calculated based on the one of the time periods measured by the measuring means over which the one of the speed clutches of the automatic transmission to be selected for the upshift has been disengaged to a basic delay time period calculated based on the output torque of the engine, to thereby calculate a delay time period by which the timing of increasing the output torque of the engine is to be delayed, and timer means for counting the delay time period.

Further preferably, the delay time period correction value is set in a manner such that the delay time period becomes longer as the one of the time periods measured by the measuring means over which the one of the speed clutches of the automatic transmission to be selected for the upshift is longer.

Further preferably, the delay time period correction value is calculated further based on the output torque of the engine.

Further preferably, when the second time period exceeds a predetermined time period, the delay time period correction value is set to a maximum value.

The above and other objects, features, and advantages of the invention will become more apparent from the following detailed description taken in conjunction with the accompanying drawings.

BRIEF DESCRIPTION OF THE DRAWINGS

FIGS. 1A and 1F collectively form a timing chart showing a case where engine output torque is changed by throttle valve control during an upshift according to the prior art, in which:

FIG. 1A shows a gear shifting command issued to change over a gear shift position from a third-speed position to a fourth-speed position;

FIG. 1B shows changes in the driving force of the engine;

FIG. 1C shows changes in engine rotational speed NE;

FIG. 1D shows changes in an engine output torque correction amount DTESFT;

FIG. 1E shows changes in throttle valve opening TH; and

FIG. 1F shows changes in the engine output torque;

FIG. 2 is a block diagram schematically showing the whole arrangement of an internal combustion engine and a control system therefor, according to an embodiment of the invention.

FIGS. 5A to 5K collectively form a timing chart useful in explaining how the control system operates during execution of the gear shifting process control in FIG. 4, in which:

FIG. 5A shows changes in the driving force of the vehicle;

FIG. 5B shows changes in the engine output torque;

FIG. 5C shows changes in the engine rotational speed NE;

FIG. 5D shows changes in the throttle valve opening TH;

FIG. 5E shows changes in an input/output rotational speed ratio ECL during an upshift;

FIG. 5F shows changes in the value of a flag FUPSFT indicative of whether or not a gear shifting command is issued;

FIG. 5G shows changes in the value of a flag FUP indicative of whether or not the upshift of the automatic transmission is being carried out;

FIG. 5H shows changes in the value of a flag FUPJOB indicative of whether or not torque shock-reducing control is being executed;

FIG. 5I shows changes in the value of a flag FECL indicative of whether or not the input/output engine rotational speed ECL during an upshift is being calculated;

FIG. 5J shows changes in the value of a flag FECLON indicative of whether or not an ECL-calculation mode is switched to an upshift mode; and FIG. 5K shows phases of the operation of the automatic transmission during the gear shifting process control;

DETAILED DESCRIPTION

Figure 3:
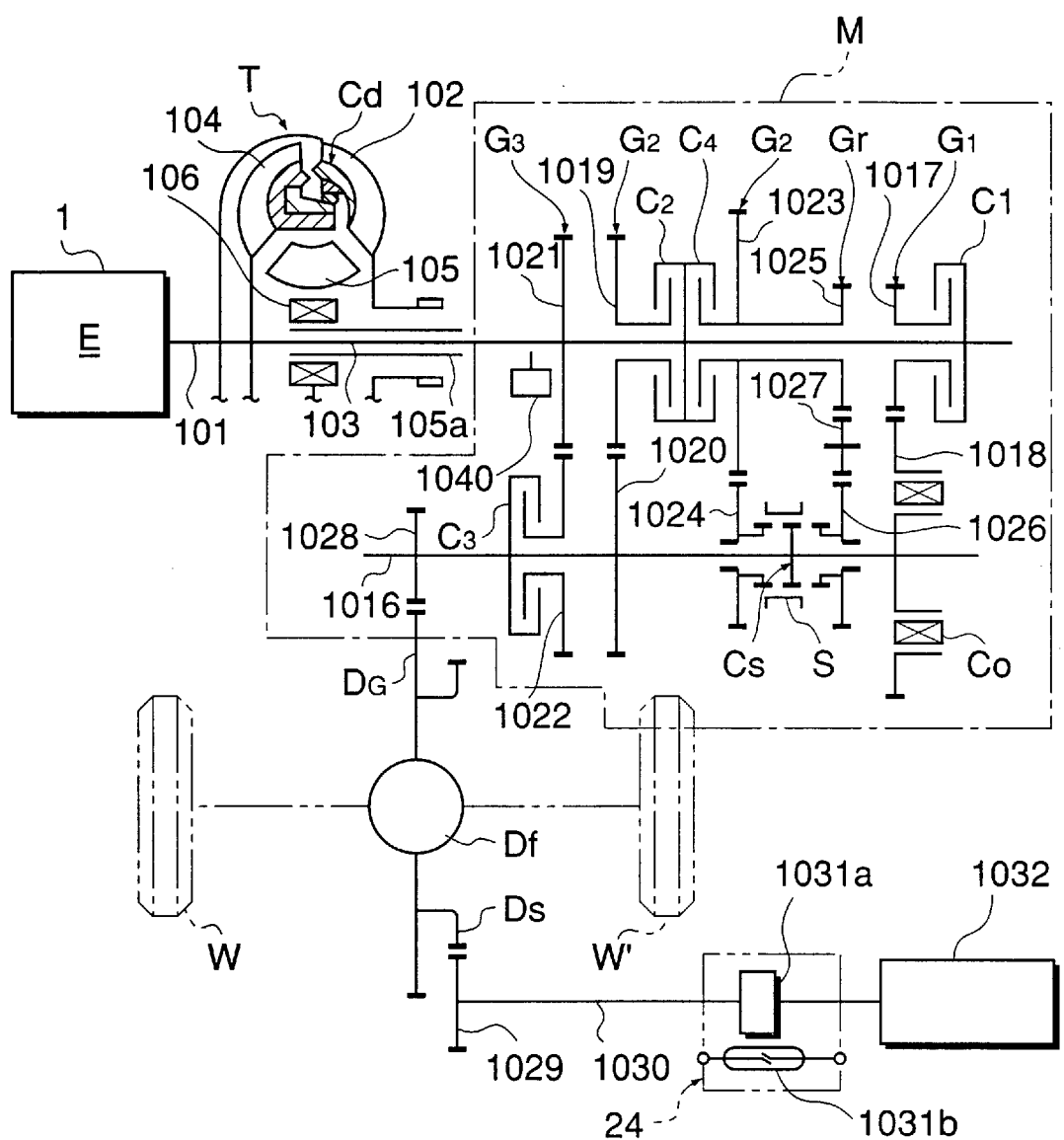
FIG. 3 is a diagram schematically showing the construction of an automatic transmission of the engine in FIG. 2.

The invention will now be described in detail with reference to the drawings showing embodiments thereof.

Referring first to FIG. 2, there is illustrated the whole arrangement of an internal combustion engine (hereinafter simply referred to as "the engine") and a control system therefor, according to an embodiment of the invention. In the figure, reference numeral 1 designates an internal combustion engine for an automotive vehicle, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute intake pipe pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating (CYL) sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine. The NE sensor 12 generates a signal pulse (hereinafter referred to as "a TDC signal pulse") at each of predetermined crank angles (e.g. whenever the crankshaft rotates through 180 degrees when the engine is of the four-cylinder engine) which each correspond to a predetermined crank angle before a top dead center (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

Further electrically connected to the ECU 5 is an automatic transmission 26 which is a conventional type and provided with a hydraulic pressure control circuit 26b for controlling the operations of a lock-up clutch and a gear mechanism of the transmission, referred to hereinafter, and a gear position sensor 26a for detecting the gear shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (the catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) of the automotive vehicle in which the engine 1 is installed and supplying a signal indicative of the sensed vehicle speed VP to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit(hereinafter referred to as "the CPU"), a memory device storing various operational programs which are executed by the CPU, and for storing results of calculations therefrom, etc., and an output circuit which supplies driving signals to the fuel injection valves 6, the throttle actuator 23, etc., and also supplies control signals to the hydraulic pressure control circuit 26b.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection period TOUT for each of the fuel injection valves 6, in synchronism with generation of TDC signal pulses, by the use of the following equation (1):

$$TOUT = Ti \times KO2 \times K1 + K2 \qquad (1)$$

where Ti represents a basic value of the fuel injection period TOUT, which is determined according to the engine rotational speed NE and the intake pipe absolute pressure PBA, by the use of a Ti map, not shown, stored in the memory means.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine is in these open-loop control regions.

K1 and K2 represent other correction coefficients and correction variables, respectively, which are set according to engine operating parameters to such values as optimize engine operating characteristics, such as fuel consumption and engine accelerability.

Driving signals corresponding to the fuel injection period TOUT calculated as above are delivered from the ECU 5 via the output circuit to the fuel injection valves 6 to drive them. Further, the CPU controls the engaged state of the lock-up clutch, the gear shift position of the gear mechanism, the valve opening TH of the throttle valve 3 in response to outputs signals from various engine operating parameter sensors.

Next, description will be made of the construction of the automatic transmission 26 with reference to FIG. 3.

FIG. 3 shows the construction of the automatic transmission 26. Output from the engine 1 is transmitted to left and right wheels W and W' of the vehicle through the crankshaft 101 of the engine, a hydraulic torque converter T, an auxiliary transmission M, and a differential Df in the mentioned order.

The hydraulic torque converter T is comprised of a pump 102 coupled to the crankshaft 101, a turbine 104 coupled to an input shaft (main shaft) 103 of the auxiliary transmission M, and a stator 105 coupled, via a one-way clutch 106, to a stator shaft 105a which in turn is supported on the input shaft 103 for rotation relative thereto. Torque is transmitted from the crankshaft 101 to the pump 102, and then to the turbine 104 in a hydrodynamic manner. When amplification of torque takes place while torque is transmitted from the pump 102 to the turbine 104, the resulting reaction force is borne by the stator 105, as is well known.

The lock-up clutch Cd is interposed between the pump 102 and the turbine 104 for mechanically coupling them together.

The auxiliary transmission M has an output shaft (counter shaft) 101b extending parallel with the input shaft 103, and is provided with a first-speed gear train G1, a second-speed gear train G2, a third-speed gear train G3, a fourth-speed gear train G4, and a reverse gear train Gr, all arranged in juxtaposition between the input and output shafts 103 and 1016. The first-speed gear train G1 is comprised of a driving gear 1017 connectable to the input shaft 103 through a first-speed clutch C1, and a driven gear 1018 connectable to the output shaft 1016 through a one-way clutch C0 and engaging with the driving gear 1017.

The second-speed gear train G2 is comprised of a driving gear 1019 connectable to the input shaft 103 through a second-speed clutch C2, and a driven gear 1020 secured to the output shaft 1016 and engaging with the driving gear 1019, while the third-speed gear train G3 is comprised of a driving gear 1021 secured to the input shaft 103, and a driven gear 1022 connectable to the output shaft 1016 through a third-speed clutch C3 and engaging with the driving gear 1021. The fourth-speed gear train G4 is comprised of a driving gear 1023 connectable to the input shaft 103 through a fourth-speed clutch C4, and a driven gear 1024 connectable to the output shaft 1016 through a selector clutch Cs and engaging with the driving gear 1023.

On the other hand, the reverse gear train Gr is comprised of a driving gear 1025 formed integrally with the driving gear 1023 of the fourth-speed gear train G4, a driven gear 1026 connectable to the output shaft 1016 through the selector clutch Cs, and an idle gear 1027 engaging with the gears 1025 and 1026. The selector clutch Cs is arranged between the driven gears 1024 and 1026 of the fourth-speed gear train G4, and has a selector sleeve S which is shiftable between a left or forward position and a right or reverse position as viewed in FIG. 3, to selectively connect the driven gear 1024 or the driven gear 1026 to the output shaft 1016. The one-way clutch C0 permits the driving torque from the engine 1 alone to be transmitted to the driving wheels W, W', while inhibiting transmission of torque from the driving wheels W, W' to the engine 1.

If the first-speed clutch C1 alone is engaged while the selector sleeve S is held in the forward position as illustrated in FIG. 3, the driving gear 1017 is connected to the input shaft 103 to establish the first-speed gear train G1, thereby allowing transmission of torque from the input shaft 103 to the output shaft 1016 therethrough. Then, if the second-speed clutch C2 is engaged with the first-speed clutch C1 maintained in its engaged state, the driving gear 1019 is connected to the input shaft 103 to establish the second-speed gear train G2 through which torque can be transmitted from the input shaft 103 to the output shaft 1016. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed clutch C2 is disengaged and the third-speed clutch C3 is engaged instead, the driven gear 1022 is connected to the output shaft 1016 to establish the third-speed gear train G3, while if the third-speed clutch C3 is disengaged and the fourth-speed clutch C4 is engaged instead, the driving gear 1023 is connected to the input shaft 103 to thereby establish the fourth-speed gear train G4. On the other hand, if the fourth-speed clutch C4 alone is engaged while the selector sleeve S of the selector clutch Cs is shifted to the right or reverse position, as viewed in FIG. 3, the driving gear 1025 and the driven gear 1026 are connected, respectively, to the input shaft 103 and the output shaft 1016 to establish the reverse gear train Gr, through which reverse torque is transmitted from the input shaft 103 to the output shaft 1016.

The torque transmitted to the output shaft 1016 is then transmitted through an output gear 1028 mounted on one end of the output shaft 1016 to an enlarged gear DG of the differential Df. A gear Ds is secured to the enlarged gear DG and engaged with a gear 1029, and a speedometer cable 1030 has one end thereof secured to the gear 1029 and the other end to a speedometer 1032 of the vehicle via a magnet 1031a of the vehicle speed sensor 24, respectively. The magnet 1031a is thus driven through the gears Ds and 1029 and the speedometer cable 1030 to indicate the traveling speed of the vehicle, while the vehicle speed sensor 24 is comprised of the aforementioned magnet 1031a, and a reed switch 1031b driven by the magnet 1031a, for instance. Rotation of the magnet 1031a in unison with the speedometer cable 1030 causes alternate closing and opening of the reed switch 1031b, and an on-off signal indicative of closing and opening of the reed switch 1031b is supplied to the ECU 5.

Arranged on the main shaft 103 is a rotational speed sensor 1040 of a magnetic pickup type for detecting the rotational speed Nm of the main shaft 103, an output signal of which is delivered to the ECU 5. An output signal indicative of the rotational speed Nc of the counter shaft 1016 obtained from the speedometer cable 1030 is also delivered to the ECU 5. An input/output rotational speed ratio ECL, i.e. the ratio of the counter shaft rotational speed Nc to the main shaft rotational speed Nm can be expressed as (Nc×r)/Nm, where r represents the reduction gear ratio between the main shaft 103 and the counter shaft 1016. The input/output rotational speed ratio ECL assumes 1.0 when there occurs no slip in the selected speed clutch, while it assumes a value less than 1.0 when a slip occurs in the selected speed clutch.

Figure 4:
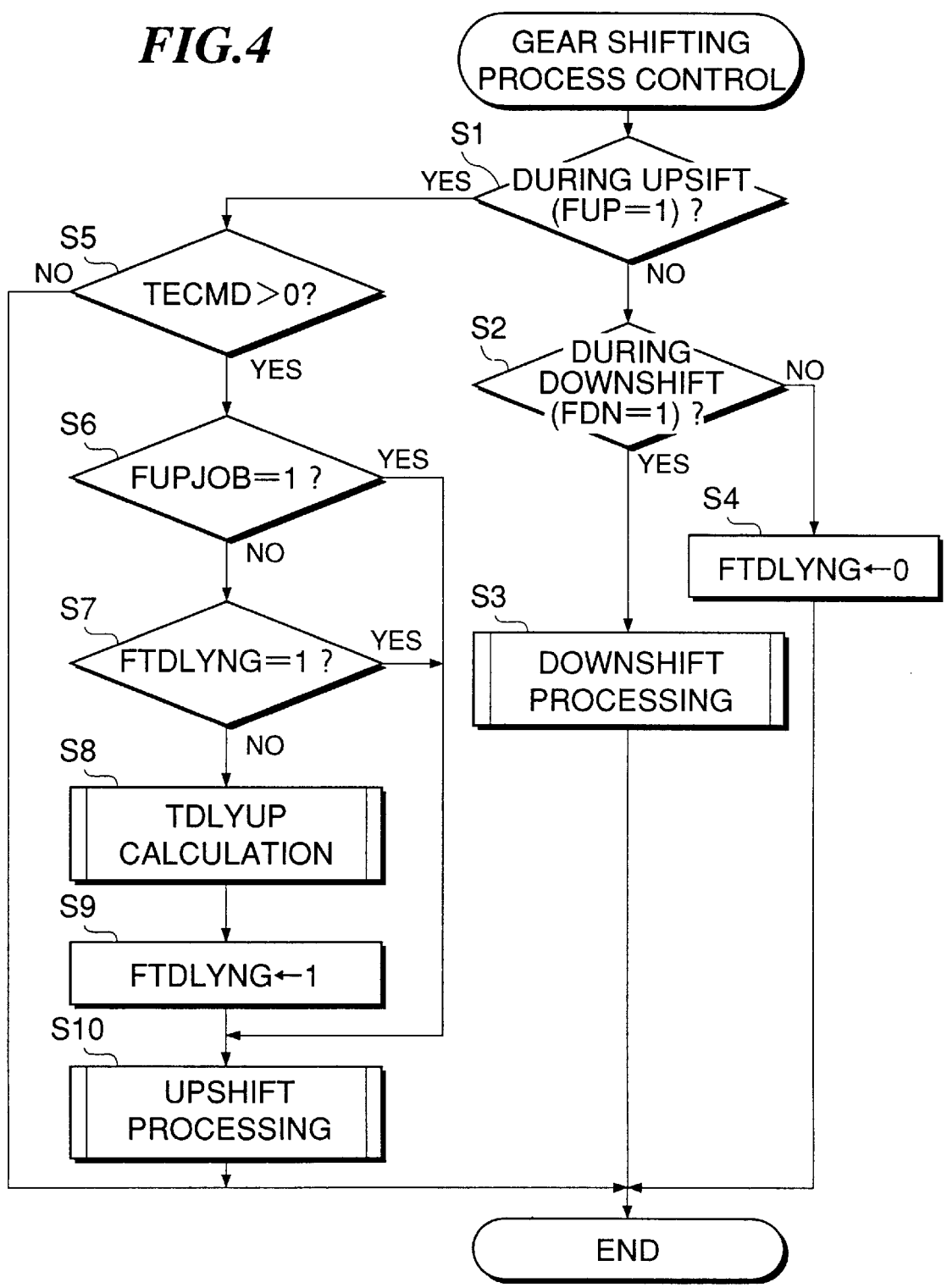
FIG. 4 is a flowchart showing a main routine for carrying out gear shifting process control, which is executed by an ECU appearing in FIG. 2.
Figure 5:
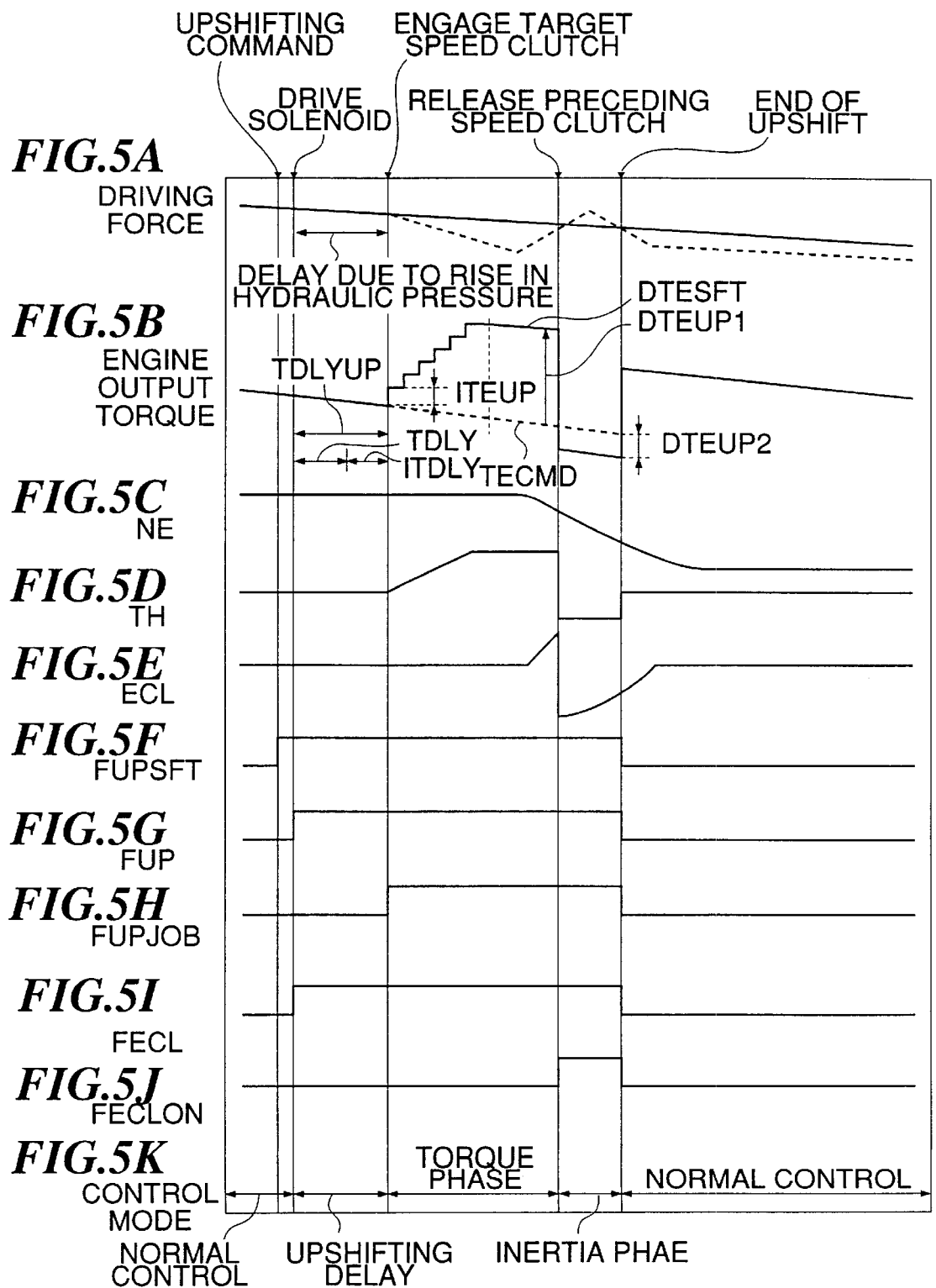

Next, description will be made of gear shifting process control according to the present embodiment. FIG. 4 shows a main routine for carrying out gear shifting process control, which is executed by the ECU 5. e.g. at predetermined time intervals.

This control reduces a shock caused by an upshift of the automatic transmission, based on gear shifting conditions of the automatic transmission, i.e. whether or not an upshift of the automatic transmission 26 is being carried out, and a desired engine output torque.

First, at a step S1, it is determined whether or not a flag FUP, which, when set to "1", indicates that an upshift of the automatic transmission 26 is being carried out, assumes "1". If it is judged that no upshift is being carried out, the program proceeds to a step S2, wherein it is determined whether or not a flag FDN, which, when set to "1", indicates that a downshift of the automatic transmission 26 is being carried out, assumes "1". If it is determined at the step S2 that the flag FDN assumes "1", predetermined downshift processing is executed at a step S3, followed by terminating the program. If it is determined at the step S2 that the downshift is not being carried out, a flag FTDLYING, which, when set to "1", indicates that setting of a TDLYUP delay timer is inhibited, is set to "0" at a step S4, followed by terminating the program.

If it is determined at the step S1 that the upshift of the automatic transmission 26 is being carried out, the program proceeds to a step S5, wherein it is determined whether or not the desired engine output torque TECMD is larger than "0". If the desired engine output torque TECMD is equal to or smaller than "0", it is judged that the upshift should be inhibited, followed by immediately terminating the program. On the other hand, if the desired engine output torque TECMD is larger than "0", it is judged that the upshift is permissible, followed by the program proceeding to a step S6. At the step S6, it is determined whether or not a flag FUPJOB, referred to hereinafter, which, when set to "1", indicates that torque shock-reducing control is being carried out, assumes "1". If the flag FUPJOB does not assume "1", i.e. if the torque shock-reducing control is not being carried out, the program proceeds to a step S7, wherein it is determined whether or not the flag FTDLYNG assumes "1". When this step is first carried out for an upshift, the flag FTDLYNG assumes "0", so that a delay time TDLYUP-calculation, referred to hereinafter, is carried out at a step S8, and at the following step S9, the flag FTDLYNG is set to "1". Then, upshift processing, referred to hereinafter, is executed at a step S10, followed by terminating the program.

On the other hand, if it is determined at the step S6 that the flag FUPJOB assumes "1", which means that the torque shock-reducing control is being executed during an upshift, or if it is determined at the step S7 that the flag FTDLYNG assumes "1", which means that setting of the TDLYUP timer is inhibited, the program skips over the steps S8 and S9 to the step S10, wherein the upshift processing is executed, followed by terminating the program.

Next, the operation of the control system during the gear shifting process control in FIG. 4 will be described with reference to a timing chart formed by FIGS. 5A to 5K. FIGS. 5A to 5K show the relationship in timing between the driving force of the vehicle, the engine output torque, the engine rotational speed NE, and other parameters and flags during an upshift. In the figure, broken lines indicate characteristics obtained according to the prior art, for comparison purposes.

When an upshift of the automatic transmission 26 is being carried out, a torque correction amount DTESFT for correcting the engine output torque to reduce a shock caused by gear shifting is calculated in a manner responsive to gear shifting conditions which change every moment, i.e. based on a shift position SFT, engine output torque (calculated based on the engine rotational speed NE and the intake pipe absolute pressure PBA), the reduction gear ratio of the transmission, the vehicle speed VP, etc. The timing of calculating the torque correction amount DTESFT will now be described:

When an upshifting command is issued and delivered to the hydraulic pressure control circuit 26b from the CPU of the ECU 5, based on the outputs from the accelerator pedal position sensor 25 and the gear position sensor 26a, gear-shifting linear solenoid valves of the gear mechanism are driven based on gear shifting conditions (first-speed position→second-speed position, second-speed position→third-speed position, third-speed position→fourth-speed position, etc.)(normal control). However, a delay time exists between the time the linear solenoid valve for the clutch of the target speed position starts to be driven and the time the operating hydraulic pressure actually rises, and therefore execution of the torque correction amount DTESFT-calculation at the step S10 in FIG. 4 is delayed until the operating hydraulic pressure rises (delay of gear shifting). The torque correction amount DTESFT is kept at "0" until the start of the calculation.

When the delay time TDLYUP calculated at the step S8 in FIG. 4 (for accommodating the delay time between the time the linear solenoid valve starts to be driven to cause the operating hydraulic pressure to rise and the time the clutch of the target speed position starts to be engaged) has elapsed and the clutch of the target speed position actually starts to be engaged, when the upshift processing is to be started at the step S10 in FIG. 4, the torque correction amount DTESFT is calculated for reducing gear shifting shock. Specifically, a maximum value DTEUP1 of the torque correction amount DTESFT (total engine output torque amount to be added) is calculated based on the gear shifting conditions, a number of times of addition of torque to be effected until the calculated maximum value is reached is calculated, and a torque increment ITEUP per one time of addition is calculated by dividing the maximum value by the number of times of addition. That is, the engine output torque is increased by adding the torque increment ITEUP to a last calculated value of the torque correction amount DTESFT to thereby obtain a present value DTESFT. When the addition is carried out the number of times of addition, the torque correction amount DTESFT reaches the maximum value DTEUP1. Thereafter, the torque correction amount DTESFT is held at the maximum value DTEUP1 (torque phase), until release of the speed clutch selected before the gear shifting is detected from a change in the engine rotational speed NE.

Then, a torque decrement DTEUP2 is calculated based on the gear shifting conditions detected at the time of detection of the release of the formerly selected clutch, and the torque correction amount DTESFT is set to the calculated torque decrement DTEUP2. Thereafter, the torque correction amount DTESFT is held at the torque decrement DTEUP2 (inertia phase) until termination of the gear shifting is detected from a change in the engine rotational speed NE, and then the torque correction amount DTESFT is set to "0" at the time of detection of the termination of the gear shifting (normal control).

Thus, the torque correction amount DTESFT is calculated at the above described timing. That is, it is basically set to a positive value at the start of an upshift which decreases the reduction gear ratio of the automatic transmission 26, so as to increase the engine output torque. On the other hand, when the upshift is completed, the value DTESFT is set to a negative value so as to decrease the engine output torque, to thereby reduce a shock caused by the upshift. When no gear shifting is effected, the torque correction amount DTESFT is set to 0.

Figure 6:
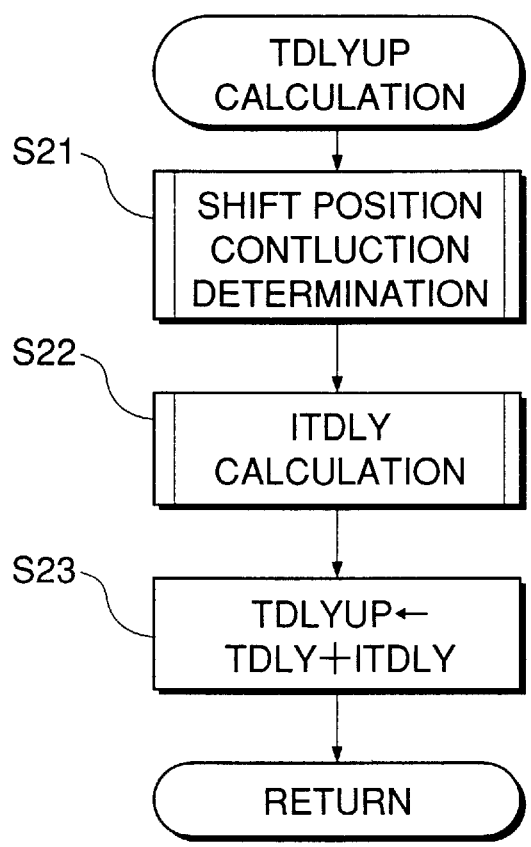
FIG. 6 is a flowchart showing a subroutine for calculating a delay time TDLYUP to be set to a TDLYUP delay timer, which is executed at a step S8 in FIG. 4.

FIG. 6 shows a subroutine for calculating the delay time TDLYUP to be set to the TDLYUP timer, which is executed at the step S8 in FIG. 4.

This processing determines the timing of increasing the engine output in the torque phase during an upshift, in dependence on hydraulic pressure prevailing within the clutch of a target speed position (including a hydraulic passage therefor) of the automatic transmission 26.

First, at steps S21 and S22, shift position continuation-determining processing and ITDLY-calculation, referred to hereinafter, are carried out, respectively, and then, at the following step S23, a delay time correction value ITDLY is added to a basic delay time TDLY to thereby obtain the delay time TDLYUP to be set to the TDLYUP delay timer, followed by terminating the program. The above steps will be described in detail hereinafter.

Figure 7:
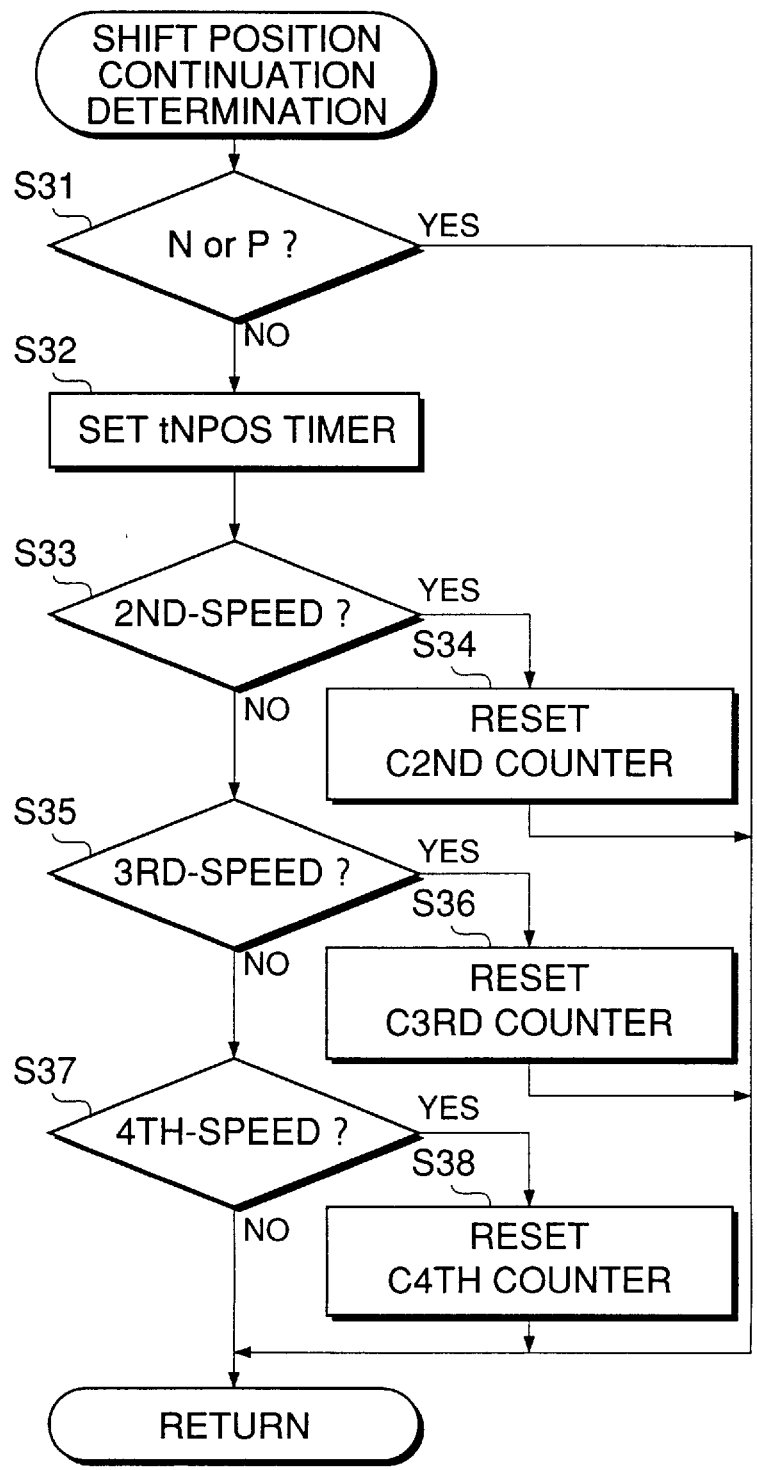
FIG. 7 is a flowchart showing a subroutine for carrying out shift position continuation-determining processing, which is executed at a step S21 in FIG. 6.

FIG. 7 shows a subroutine for carrying out the shift position continuation-determining processing, which is executed at the step S21 in FIG. 6.

First, at a step S31, it is determined whether or not the automatic transmission 26 is in a neutral (N) position or a parking (P) position, e.g. based on an electric signal from a selector position sensor, not shown. If the automatic transmission 26 is in the neutral position or the parking position, the program is immediately terminated.

If it is determined at the step S31 that the automatic transmission is neither in the neutral position nor in the parking position, a neutral position continuation downcount (tNPOS) timer is set to a predetermined count value (i.e. a predetermined time period) at a step S32, followed by the program proceeding to steps S33 et seq. More specifically, if the automatic transmission 26 is in the second-speed position (i.e. if the answer to the question of the step S33 is affirmative (YES)), a C2ND upcount timer is reset at a step S34, followed by terminating the program. If the automatic transmission 26 is in the third-speed position (i.e. if the answer to the question of the step S35 is affirmative (YES)), a C3RD upcount timer is reset at a step S36, and if the automatic transmission 26 is in the fourth-speed position (i.e. if the answer to the question of the step S37 is affirmative (YES)), a C4TH upcount timer is reset at a step S38, each of the steps S34, S36 and S38, each of the steps S34, S36 and S38 being followed by terminating the program. If the automatic transmission 26 is not in any of the second-speed position, the third-speed position, and the fourth-speed position (all the answers to the questions of S33, S35 and S37 are negative (NO)), the program is terminated.

When the automatic transmission 26 is in the neutral position or in the parking position, hydraulic oil within the respective speed clutches (including the hydraulic passages) of the automatic transmission 26 is drained so that the hydraulic pressure drops to a low level.

The tNPOS timer is set to the predetermined count value at the step S32 when the automatic transmission is shifted from the neutral or parking position to any desired speed position (drive range), i.e. when the answer to the question of the step S31 is negative (NO)). The predetermined time period starts to be counted down from a time point at which the answer to the question of the step S31 has changed from "NO" to "YES".

The C2ND upcount timer is reset when the automatic transmission 26 is shifted to the second-speed position (i.e. when the answer to the question of the step S33 is affirmative (YES)), and is started when the answer to the question of the step S33 has become negative (NO). That is, the C2ND upcount timer counts up a time period during which the second speed clutch of the automatic transmission 26 is in a disengaged state. The CR3D and C4TH upcount timers operate similarly at the steps S36 and S38, respectively. Thus, it is possible to measure a time period during which each speed clutch of the automatic transmission 26 is in its disengaged state.

Figure 8:
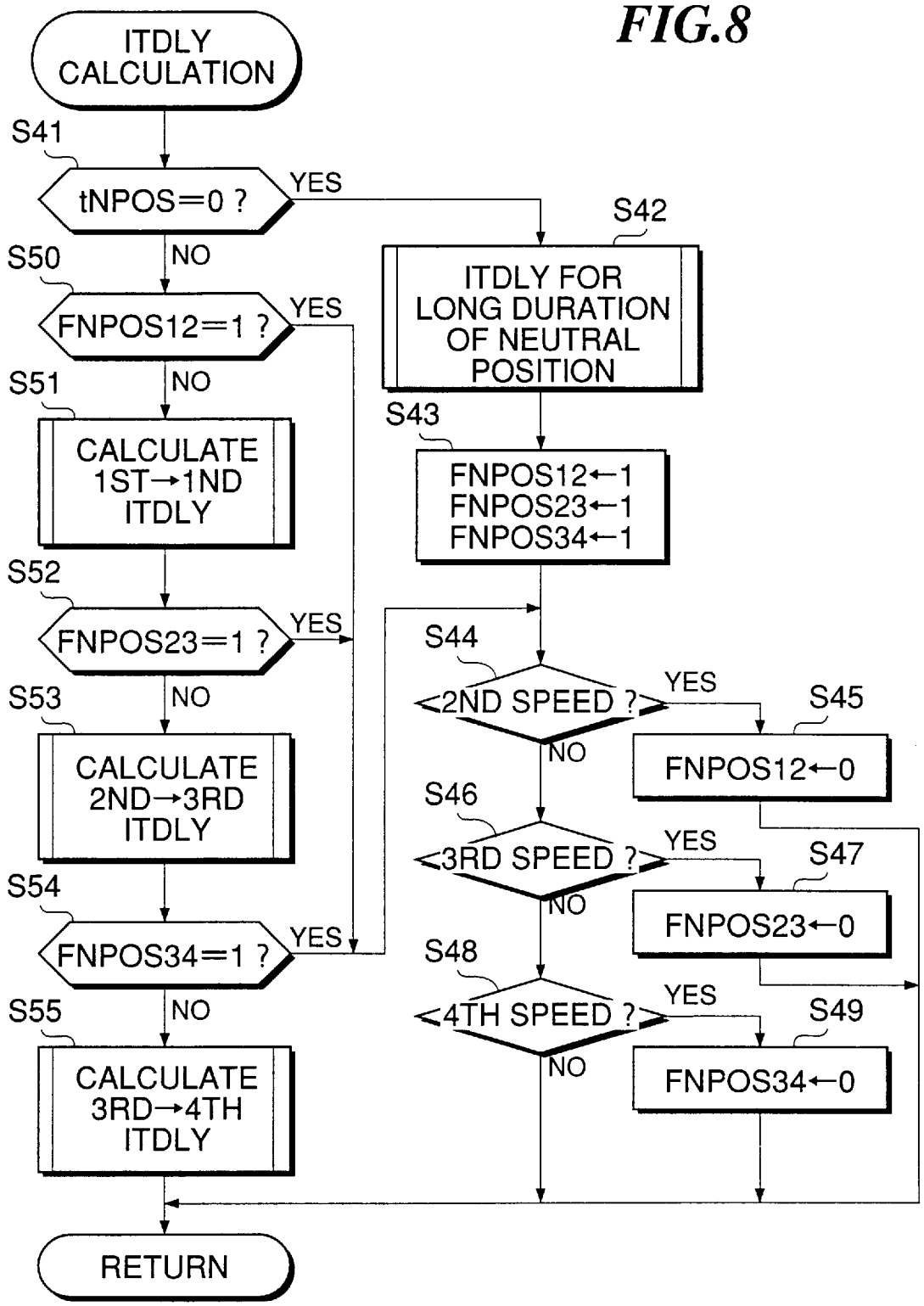
FIG. 8 is a flowchart showing a subroutine for calculating a delay time correction value ITDLY, which is executed at a step S22 in FIG. 6.

FIG. 8 shows a subroutine for calculating the delay time correction value ITDLY, which is executed at the step S22 in FIG. 6.

Figure 9:
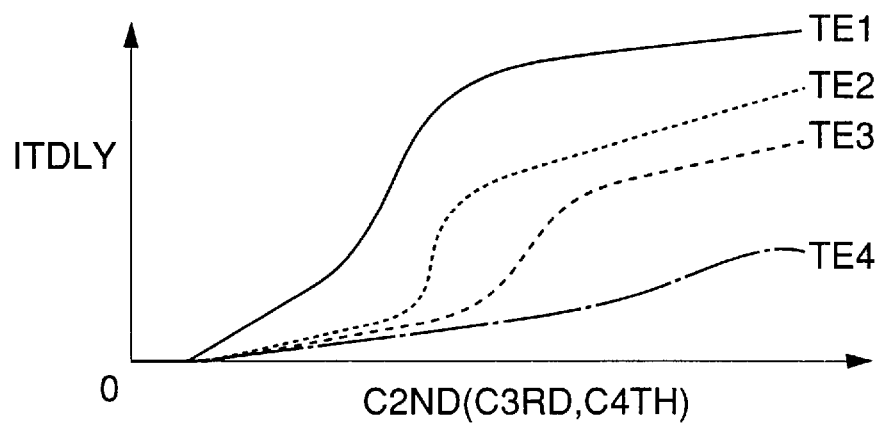
FIG. 9 shows an ITDLY map for determining the delay time correction value ITDLY according to counts of C2ND, C3RD and C4TH count timers for respective speed positions of the automatic transmission.

First, it is determined at a step S41 whether or not the count of the neutral position continuation downcount (tNPOS) timer is equal to "0". If the count of the tNPOS timer is equal to "0" at the step S41, it is judged that a condition in which the automatic transmission 26 is in the neutral position or in the parking position has continued over the predetermined time period, which means that hydraulic pressure within the respective speed clutches has completely fallen, and then the delay time correction value ITDLY is calculated in a manner suitable for a long duration of the neutral position at a step S42. In this connection, to calculate the delay time correction value ITDLY at step S51, S53 and S55, hereinafter referred to, an ITDLY map shown in FIG. 9 is retrieved according to a time period counted up by each of the C2ND, C3RD and C4TH upcount timers for the speed positions of the automatic transmission 26, and engine output torque (TE1 to TE4), and interpolation is carried out, if required. The map of FIG. 9 is provided for each upshifting pattern (gear shifting conditions). In the calculation of the delay time correction value ITDLY suitable for a long duration of the neutral position at the step S42, however, the maximum value of the delay time correction value ITDLY corresponding to the engine output torque (TE1 to TE4) for each upshifting pattern is selected, regardless of the count of the C2ND, C3RD or C4TH upcount timer.

Next, at a step S43, flags FNPOS12, FNPOS23 and FNPOS34, each of which, when set to "1", indicates that hydraulic pressure within each corresponding speed clutch has completely fallen, are all set to "1", followed by the program proceeding to steps S44 to S49. At these steps, if the automatic transmission 26 is in the second-speed position (i.e. if the answer to the question of the step S44 is affirmative (YES)), the flag FNPOS12 is set to "0" at the step S45, followed by terminating the program. If the automatic transmission 26 is in the third-speed position (i.e. if the answer to the question of the step S46 is affirmative (YES)), the flag FNPOS23 is set to "0" at the step S47, and if the automatic transmission 26 is in the fourth-speed position (i.e. if the answer to the question of the step S48 is affirmative (YES)), the flag FNPOS34 is set to "0" at the step S49, each of the steps S45, S47 and S49 being followed by terminating the program. However, in the present case, the automatic transmission 26 is not in any of the second to fourth-speed positions (i.e. all the answers to the questions of the steps S44, S46 and S48 are negative (NO)), so that the program is immediately terminated.

If the count of the tNPOS timer is not equal to "0" at the step S41, it is judged that the condition in which the automatic transmission 26 is in the neutral or parking position has not continued over the predetermined time period, which means that hydraulic pressure within the clutch of each speed position of the automatic transmission 26 has not completely fallen, so that the program proceeds to steps S50 to S55. More specifically, it is determined at a step S50 if the flag FNPOS12 assumes "1". If the flag FNPOS12 assumes "0", the program proceeds to a step S51, wherein a delay time correction value ITLDY for an upshift of first-speed position→second-speed position is calculated at the step S51 from the FIG. 9 map. Then, it is determined at a step S52, whether or not the flag FNPOS23 assumes "1". If the flag FNPOS23 assumes "0" at the step S52, a delay time correction value ITLDY for an upshift of second-speed position→third-speed position is calculated at the step S53 from the FIG. 9 map. Then, the program proceeds to a step S54, wherein it is determined whether or not the flag FNPOS34 assumes "1". If the flag FNPOS34 assumes "0" at the step S54, a delay time correction value ITLDY for an upshift of third-speed position→fourth-speed position is calculated at the step S55 from the same map, followed by terminating the program. On the other hand, if any one of the flags FNPOS12, FNPOS23, and FNPOS34 assumes "1", i.e. if any one of the questions at the steps S50, S52, and S54 is affirmative (YES), the program proceeds to the step S44. Thus, an ITDLY value for use in an upshift of first-speed position→second-speed position, second-speed position→third-speed position, or third-speed position→fourth-speed position is calculated. That is, the ITDLY value applied during an upshift for each speed clutch is set to a larger value as the time period (C2ND, C3RD, C4TH) over which the speed clutch has been in its disengaged state is longer, while it is set to the maximum value when the automatic transmission has been continuously been in the neutral position over the predetermined time period tNPOS.

Figure 10:
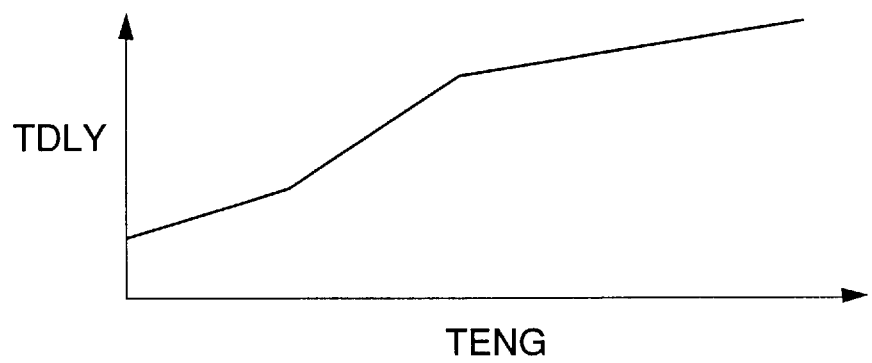
FIG. 10 shows a map for determining a basic delay time TDLY according to the engine output torque.

Referring again to FIG. 6, at the step S23, the basic delay time TDLY of the delay time during an upshift is determined by retrieving a TDLY map shown in FIG. 10 according to the engine output torque TENG. The map is set such that the basic delay time TDLY value increases with increase in the engine output torque TENG. Further, the TDLY map is provided for each upshifting pattern.

Next, the delay time correction value ITDLY obtained at the step S42, S51, S53 or S55 is added to the basic delay time TDLY, to thereby obtain the delay time TDLYUP to be set to the TDLYUP delay timer for use during the upshift.

By the use of the corrected delay time TDLYUP, it is possible to make the timing of increasing the throttle valve opening TH coincide with the timing of increasing the torque correction amount DTESFT, i.e. increasing the engine output torque (a time point at which the driving force of the vehicle starts to drop) (see FIG. 5A to 5K).

Next, the upshift processing, which is executed at the step S10 in FIG. 4, will be described in detail with reference to FIG. 11.

First, at a step S60, it is determined whether or not the count of the TDLYUP delay timer set to the delay time TDLYUP calculated at the step S8 in FIG. 4 has become equal to "0".

When the step S60 is first carried out, the count of the TDLYUP delay timer is not equal to "0", and then the program proceeds to a step S61, wherein a flag FECLON, which, when set to "1", indicates that the torque decrease control is to be executed, based on the ECL value, is set to "0", and at the same time, the flag FUPJOB is set to "0". Then, an increased engine output torque TENGUP1 is calculated at a step S62, WOT-checking for limit checking of the engine output is executed at a step S63, and at a step S64, the torque increment ITEUP as well as the number nUP of times of addition of torque are calculated. Further, calculation of predetermined upper and lower limit values TDSOBJLH and TDSOBJLL of a required driving force (step S65), setting of a TUPOUT timer (step S66), and resetting of the engine output torque correction amount DTESFT (step S67) are sequentially executed, followed by terminating the program.

Figure 12:
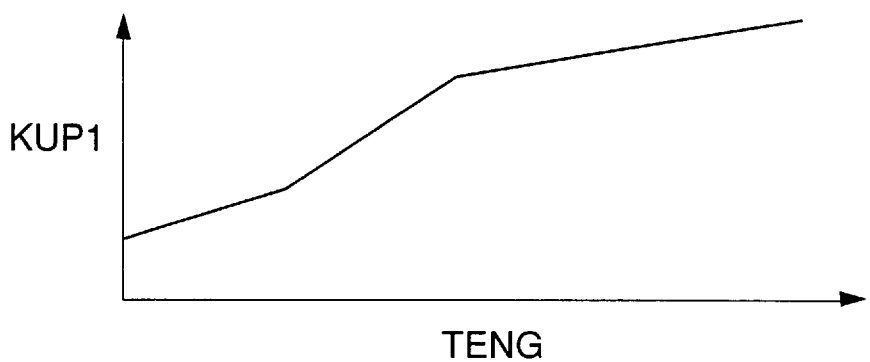
FIG. 12 shows a map for determining an engine output torque-increasing coefficient KUP1 according to the engine output torque TENG.

The increased engine output torque TENGUP1 is calculated from the desired engine output TECMD and an engine output-increasing coefficient KUP1, which is obtained by retrieving a KUP1 map shown in FIG. 12 according to the engine output torque TENG, by the use of the following equation:

$$TENGUP1=KUP1\times TECMD \quad (2)$$

Figure 11:
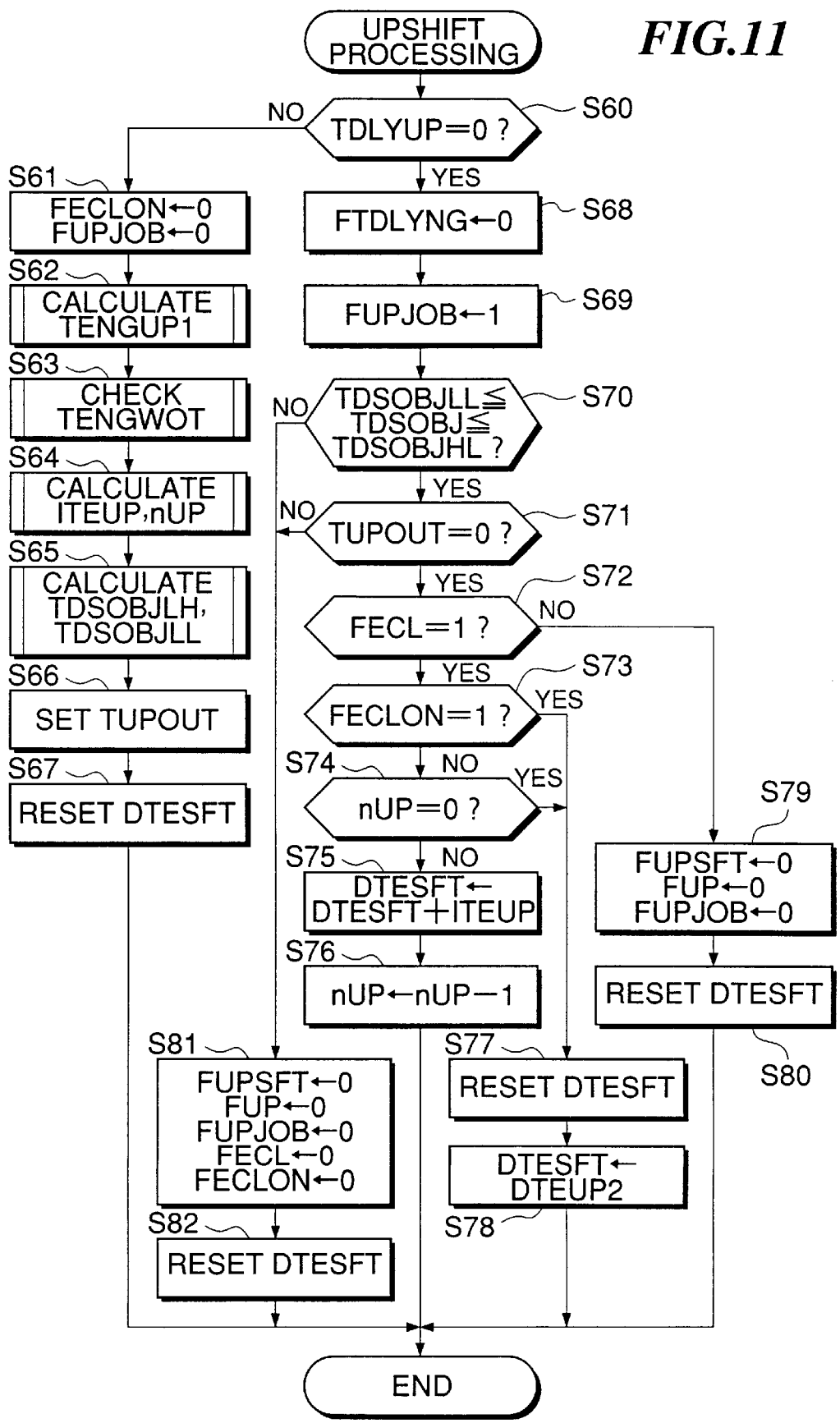
FIG. 11 is a flowchart showing a subroutine for carrying out upshift processing, which is executed at a step S10 in FIG. 4.
Figure 13:
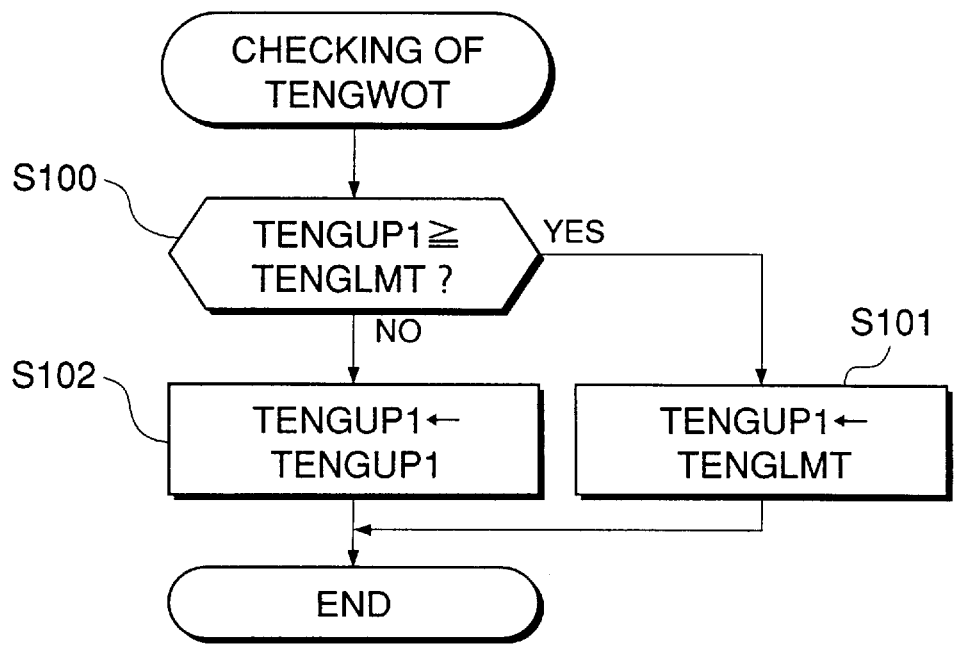
FIG. 13 is a flowchart showing a subroutine for limit-checking of increased engine output, which is executed at a step S63 in FIG. 11.

FIG. 13 shows a subroutine for carrying out the WOT-checking i.e. limit-checking of the engine output, which is executed at the step S63 in FIG. 11.

Figure 14:
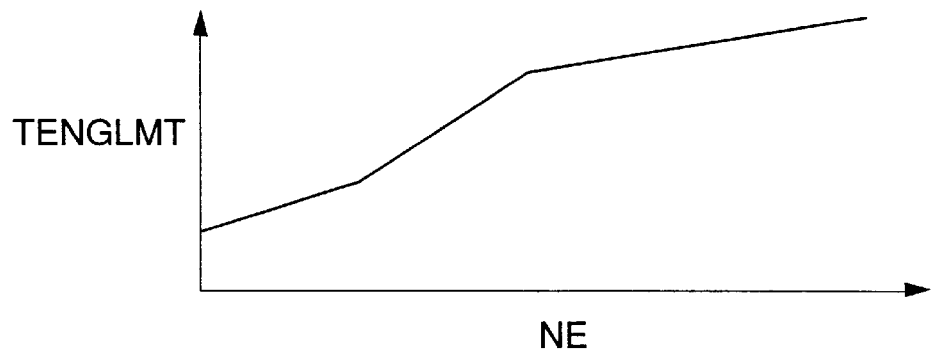
FIG. 14 shows a map for determining a limit value TENGLMT of the increased engine output according to the engine rotational speed NE.

At a step S100 in FIG. 13, it is determined whether or not the increased engine output torque TENGUP1 is equal to or larger than a predetermined limit value TENGLMT. The predetermined limit value TENGLMT is determined e.g. by retrieving a map shown in FIG. 14 according to the engine rotational speed NE.

If it is determined at the step S100 that the increased engine output torque TENGUP1 is equal to or larger than the predetermined limit value TENGLMT, the increased engine output torque TENGUP1 is set to the predetermined limit value TENGLMT at a step S101, followed by terminating the program. On the other hand, if it is determined at the step S100 that the increased engine output torque TENGUP1 is smaller than the predetermined limit value TENGLMT, the increased engine output torque TENGUP1 is held at the present value at a step S102, followed by terminating the program. Thus, the increased engine output torque TENGUP1 is limited to the maximum value TENGLMT.

Next, the calculation of the torque increment ITEUP per one time of addition and the number nUP of times of addition of torque, which is executed at the step S64 in FIG. 11, will be described.

Figure 15:
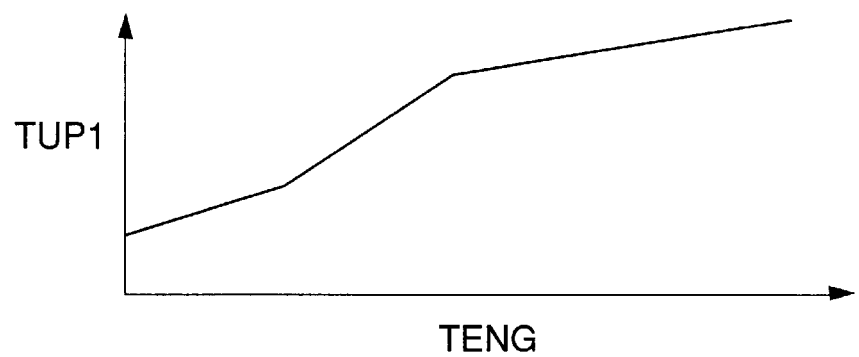
FIG. 15 shows a map for determining a torque-phase time period TUP1 according to the engine output torque TENG.

The ITEUP value and the nUP value are calculated by the use of the following equations:

$$ITEUP=DTEUP1/nUP \quad (3)$$

$$DTEUP1=TENGUP1-TECMD \quad (4)$$

$$nUP=TUP1/5ms \quad (5)$$

wherein TUP1 represents a torque-phase time period during which the torque phase of the automatic transmission is to continue. The TUP1 value is determined by retrieving a TUP1 map shown in FIG. 15 according to the engine output torque TENG. That is, the total amount DTEUP1 of engine output torque to be added and the number nUP of times of addition of torque are calculated, and the torque increment ITEUP per one time of addition is calculated by dividing the total amount DETUP1 of engine output torque to be added by the number nUP of times of addition.

The calculation of the predetermined upper and lower limit values TDSBOJLH and TDSBOJLL of the required driving force, which is executed at the step S65 in FIG. 11, is carried out by the use of the following equations (6) and (7):

$$TDSOBJLH=TDSOBJ+DTDSULT \quad (6)$$

$$TDSOBJLL=TDSOBJ-DTDSULT \quad (7)$$

where TDSOBJ represents a required driving force, which is set, e.g. to a value obtained by multiplying the desired engine output torque by a value indicative of the selected gear ratio of the automatic transmission and a transmission coefficient of the torque converter, and DTDSULT represents a predetermined value for limiting an amount of change in the required driving force.

If it is determined at the step S60 that the count of the TDLYUP delay timer has become equal to "0", the flag FTDLYNG is set to "0" at a step S68, and the flag FUPJOB is set to "1" at a step S69. Then, at the following step S70, it is determined whether or not the required driving force TDSOBJ is within a range defined by the predetermined upper and lower limit values TDSOBJLH and TDSOBJLL. If the answer to the question of the step S70 is affirmative (YES), the program proceeds to a step S71, wherein it is determined whether or not the count of the TUPOUT timer set at the step S66 is equal to "0". If the count of the timer TUPOUT is equal to "0", it is judged that a predetermined time period set to the TUPOUT timer has elapsed after the count of the TDLYUP delay timer became equal to "0", followed by the program proceeding to a step S72. At the step S72, it is determined whether or not a flag FECL, which, when set to "1" based on the input/output rotational speed ratio ECL, indicates that a time period during which the upshift processing is to be executed, has not elapsed, assumes "1".

If the flag FECL assumes "1" at the step S72, the program proceeds to a step S73, wherein it is determined whether or not the flag FECLON assumes "1".

When the step S73 is first carried out for the present processing, the flag FECLON assumes "0" (this flag is set to "1" when the ECL value increases to a predetermined value during an upshift), and then the program proceeds to a step S74. At the step S74 and the following two steps S75 and S76, processing in the torque phase is executed. That is, it is determined at the step S74 whether or not the number nUP of times of addition of torque is equal to "0". If the number nUP of times of addition of torque is not equal to "0", it is judged that the torque phase still continues, and then at the step S75, the torque increment ITEUP per one time of addition is added to the immediately preceding value of the torque correction amount DTESFT (initially equal to "0") to thereby obtain a present torque correction amount DTESFT. Then, the number nUP of times of addition is decremented by "1" at the step S76, followed by terminating the program.

Figure 16:
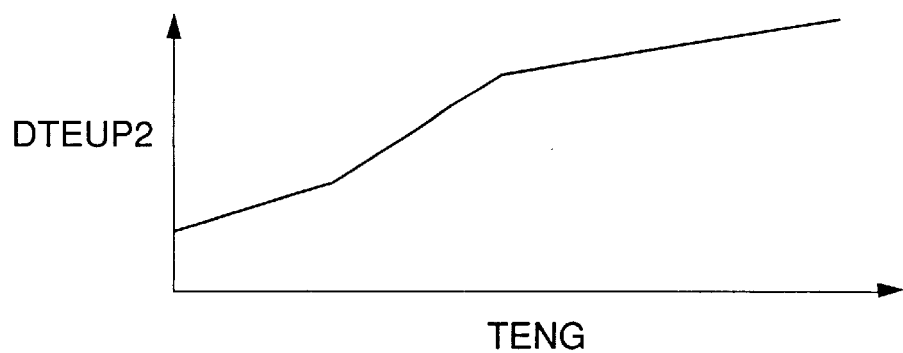
FIG. 16 shows a map for determining an engine output decrement DTEUP2 according to the engine output torque TENG.

On the other hand, if the flag FECLON assumes "1" at the step S73, i.e. if the torque control mode is switched to a mode of correcting the engine output torque in an inertia phase, or if the number nUP of times of addition of torque is equal to "0" at the step S74, it is judged that the torque phase has terminated, and then the program proceeds to a step S77. At the step S77 and the following step S78, processing in the inertia phase is executed. That is, the torque correction amount DTESFT is reset to "0" at the step S77, and then at the step S78, the torque correction amount DTESFT is set to a torque decrement DTEUP2, i.e. a value to be subtracted from the desired engine output torque TEMCD value, followed by terminating the program. The torque decrement DTEUP2 is calculated e.g. by retrieving a DTEUP2 map shown in FIG. 16 according to the engine output torque TENG.

Further, if the flag FECL does not assume "1" at the step S72, it is judged that the gear shifting has been completed, and then the program proceeds to a step S79. At the step S79 and the following step S80, processing to be executed upon termination of gear shifting is executed. That is, a flag FUPSFT, which, when set to "1", indicates that an upshifting command is issued, the flag FUP, which, when set "1"indicates that upshifting is being carried out, and the flag FUPJOB are each set to "0" at the step S79, and then, the torque correction amount DTESFT is reset to "0" at the step S80, followed by terminating the program.

Further, if it is determined at the step S70 that the required driving force TDSOBJ is not within the range defined by the predetermined upper and lower limit values TDSOBJLH and TDSOBJLL, or if the count of the TUPOUT timer is not equal to "0" at the step S71, steps S81 and S82 are executed, followed by terminating the program. More specifically, each of the flags FUPSFT, FUP, FUPJOB, FECL and FECLON is set to "0" at the step S81, and then, the torque correction amount DTESFT is reset to "0" at the step S82.

As described above, according to the present embodiment, the delay time correction value ITDLY for the delay timer for use during an upshift, which is determined at the step S42, S51, S53 or S55 based on the duration of the neutral position or the time period over which the selected speed clutch has been in a disengaged state, is added to a basic delay time TDLY to thereby obtain the delay time TDLYUP to be set to the TDLYUP delay timer for use during the upshift. Therefore, it is possible to set the timing of increasing the engine output torque in a manner compensating for variations in the amount of oil held within the respective speed clutches (including hydraulic passages therefor) of the automatic transmission 26, to thereby reduce a shock caused by gear shifting.

Next, another embodiment of the invention will be described.

In the above described embodiment, the duration of the neutral position of the automatic transmission 26 and the duration of disengagement of the selected speed clutch of the automatic transmission 26 are measured, and then the timing of increasing the output torque from the engine 1 is changed based on the measured duration, while in the present embodiment, an operating parameter of the engine 1 and an operating parameter of the automatic transmission 26 are detected, the duration of the neutral position and the duration of dischargement of the selected clutch are estimated from the detected parameters, and the timing of increasing the engine output torque is changed based on the estimated duration. The parameters include, e.g. oil temperature within the automatic transmission 26, and the engine coolant temperature TW.

According to this embodiment, since the timing of increasing the engine output torque is changed based on operating parameters of the internal combustion engine 1 and the automatic transmission 26, it is possible to set the timing of increasing the engine output torque in a manner compensating for variations in the amount of oil within the respective speed clutches (including hydraulic passages therefor) of the automatic transmission 26, to thereby also positively reduce a shock caused by gear shifting.

What is claimed is:

1. A control system for an internal combustion engine for an automotive vehicle, said engine having an automatic transmission having a plurality of speed clutches, and engine output torque-increasing means operable during an upshift of said automatic transmission, for increasing output torque of said engine so as to reduce a shock generated during said upshift, the control system comprising:

measuring means for measuring time periods over which respective ones of said speed clutches of said automatic transmission have been disengaged; and timing-changing means for changing timing of increasing said output torque of said engine during said upshift of said automatic transmission, based on one of said time periods measured by said measuring means over which one of said speed clutches of said automatic transmission to be selected for said upshift has been disengaged.

2. A control system as claimed in claim 1, including second measuring means for measuring a second time period over which said automatic transmission has continuously been in a neutral position, and wherein said timing-changing means changes said timing of increasing said output torque of said engine, based on said second time period measured by said second measuring means, in place of said one of said time periods over which said one of said speed clutches of said automatic transmission to be selected for said upshift has been disengaged.

3. A control system as claimed in claim 1 or 2, including delay time period-calculating means for adding a delay time period correction value calculated based on said one of said time periods measured by said measuring means over which said one of said speed clutches of said automatic transmission to be selected for said upshift has been disengaged to a basic delay time period calculated based on said output torque of said engine, to thereby calculate a delay time period by which said timing of increasing said output torque of said engine is to be delayed, and timer means for counting said delay time period.

4. A control system as claimed in claim 3, wherein said delay time period correction value is set such that said delay time period becomes longer as said one of said time periods measured by said measuring means over which said one of said speed clutches of said automatic transmission to be selected for said upshift is longer.

5. A control system as claimed in claim 3, wherein said delay time period correction value is calculated further based on said output torque of said engine.

6. A control system as claimed in claim 3, wherein when said second time period exceeds a predetermined time period, said delay time period correction value is set to a maximum value.

* * * * *